United States Patent
Ishida et al.

(10) Patent No.: US 11,764,945 B2
(45) Date of Patent: Sep. 19, 2023

(54) DATA PROCESSING DEVICE, METHOD, AND COMPUTER PROGRAM

(71) Applicant: ZENMUTECH, INC, Tokyo (JP)

(72) Inventors: Yusuke Ishida, Tochigi (JP); Atsushi Kunii, Tokyo (JP); Jun-ichi Oketani, Saitama (JP); Shimpei Kunii, Tokyo (JP)

(73) Assignee: ZENMUTECH, INC, Tokyo (JP)

( * ) Notice: Subject to any disclaimer, the term of this patent is extended or adjusted under 35 U.S.C. 154(b) by 471 days.

(21) Appl. No.: 17/058,620

(22) PCT Filed: May 24, 2019

(86) PCT No.: PCT/JP2019/020628
§ 371 (c)(1),
(2) Date: Nov. 24, 2020

(87) PCT Pub. No.: WO2019/225735
PCT Pub. Date: Nov. 28, 2019

(65) Prior Publication Data
US 2021/0211270 A1      Jul. 8, 2021

(30) Foreign Application Priority Data

May 25, 2018 (JP) ................................. 2018-100539

(51) Int. Cl.
*H04L 9/06*          (2006.01)
*H04L 9/08*          (2006.01)

(52) U.S. Cl.
CPC .......... *H04L 9/0631* (2013.01); *H04L 9/0869* (2013.01); *H04L 9/0894* (2013.01)

(58) Field of Classification Search
None
See application file for complete search history.

(56) References Cited

U.S. PATENT DOCUMENTS

2006/0294386 A1* 12/2006 Yuval .................... H04L 9/0631
                                                         380/37
2017/0366340 A1* 12/2017 Wyseur ................ H04L 9/0631
(Continued)

FOREIGN PATENT DOCUMENTS

EP          3598334 A1     1/2020
JP          6221196 B1     11/2017

OTHER PUBLICATIONS

Ronald L. Rivest, "All-or-Nothing Encryption and the Package Transform", FSE '97 Proceedings of Fast Software Encryption, pp. 210-218, 1997, 9pp.
(Continued)

*Primary Examiner* — Bassam A Noaman
(74) *Attorney, Agent, or Firm* — HAUPTMAN HAM, LLP

(57) ABSTRACT

A data processing apparatus includes a processing circuit configured to segment an original bit sequence into a plurality of input blocks each having a first block length, create a random bit sequence, encrypt respective ones of the plurality of input blocks with a block cipher scheme using a key (having a key length larger than the first block length) based on the random bit sequence to derive intermediate blocks, concatenate every predetermined number of intermediate blocks to form one or more output blocks, compute an invertible transformation function on the one or more output blocks and the random bit sequence to derive a further output block, and output an encrypted bit sequence including those output blocks.

14 Claims, 11 Drawing Sheets

(56) References Cited

U.S. PATENT DOCUMENTS

2018/0285582 A1* 10/2018 Resch .................... H04L 9/065
2019/0109715 A1*  4/2019 Hars ..................... H04L 63/123

OTHER PUBLICATIONS

Anand Desai, "The Security of All-Or-Nothing Encryption: Protecting Against Exhaustive Key Search", Advances in Cryptology—CRYPTO 2000, pp. 359-375, LNCS vol. 1880, 2000, 17pp.
Victor Boyko, "On the Security Properties of OAEP as an All-or-Nothing Transform", Advances in Cryptology—CRYPTO 1999, pp. 503-518, LNCS vol. 1666, 1999, 16pp.

* cited by examiner

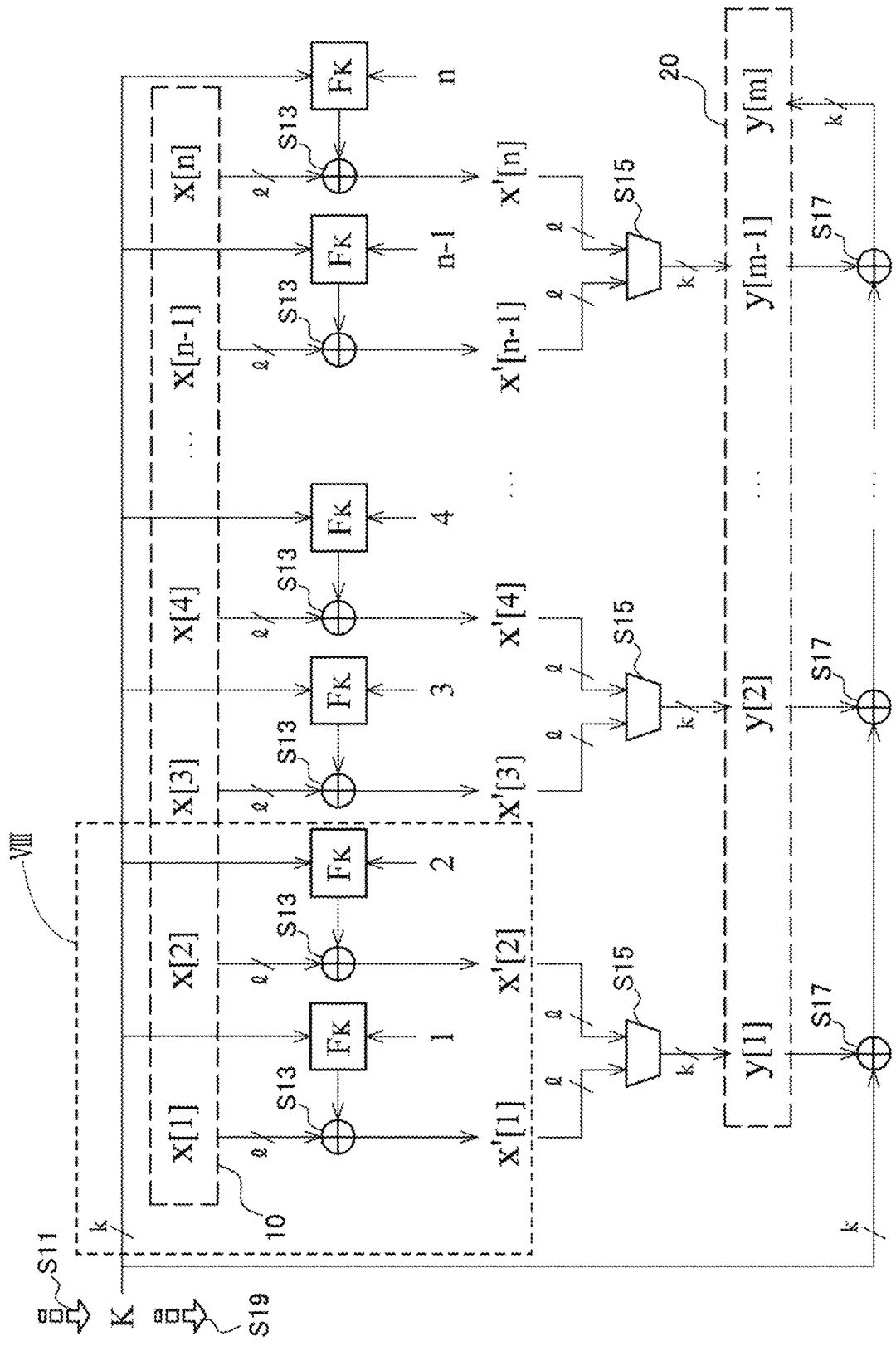
[Fig.1]

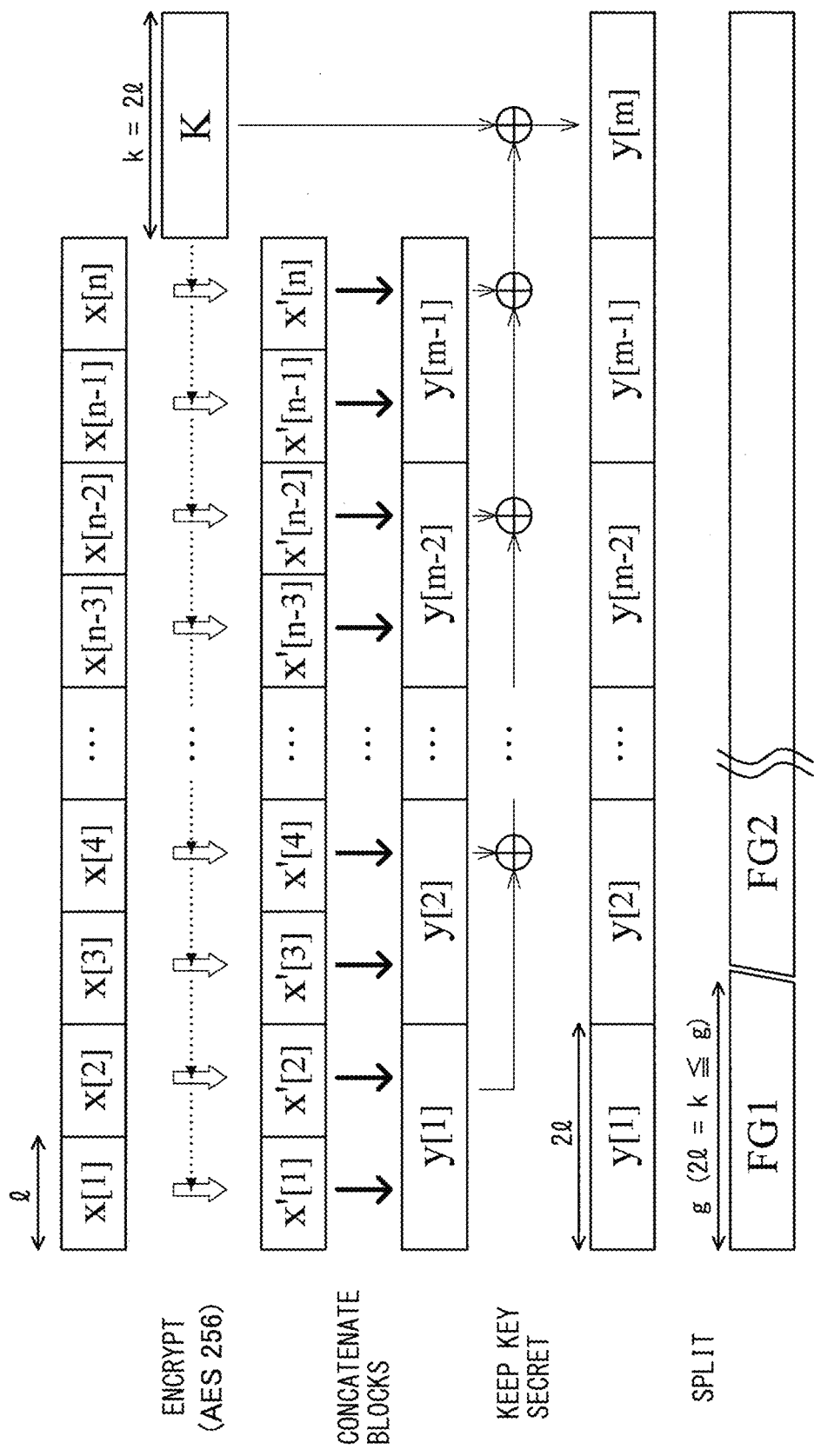

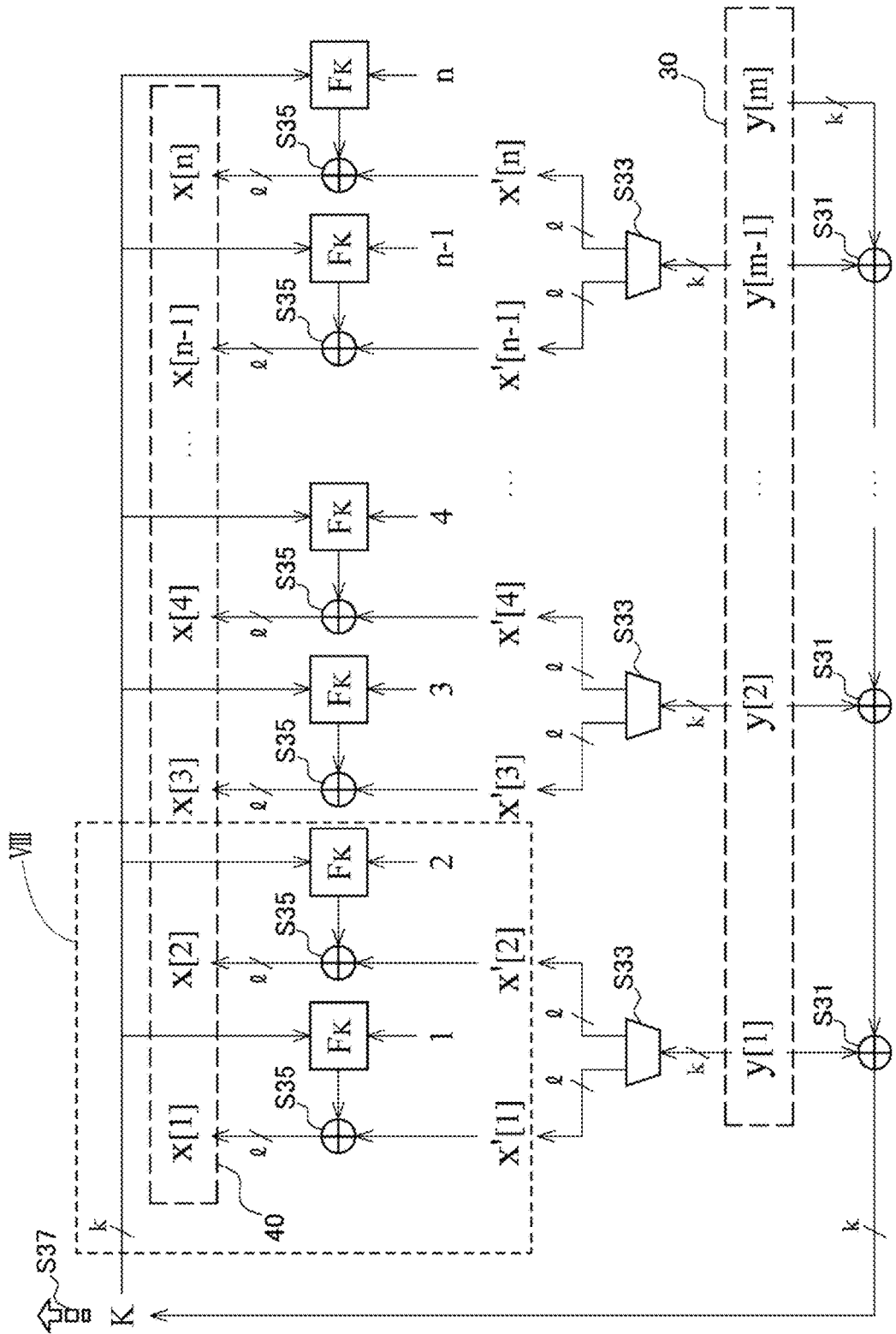
[Fig.3]

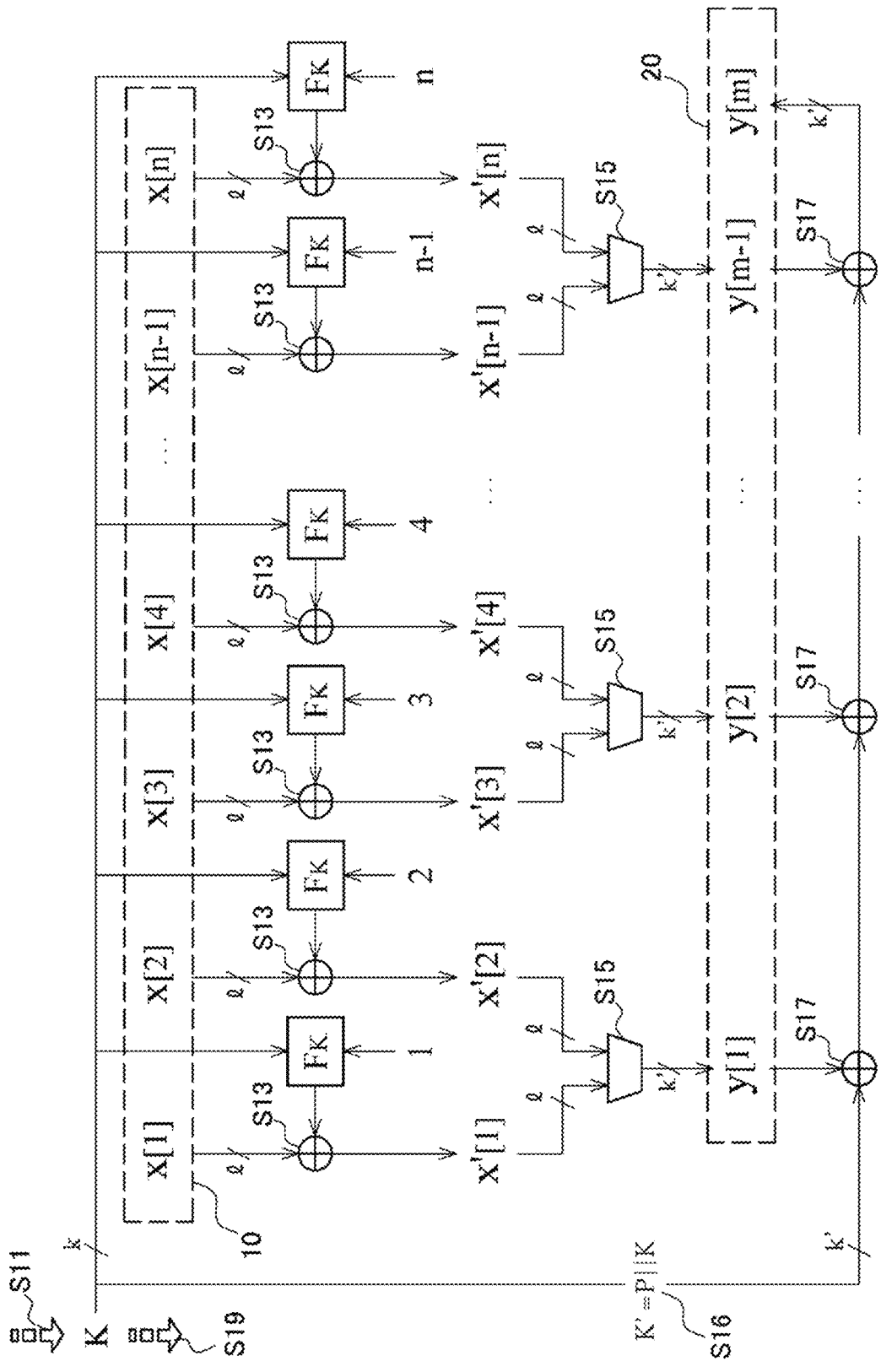
[Fig.4]

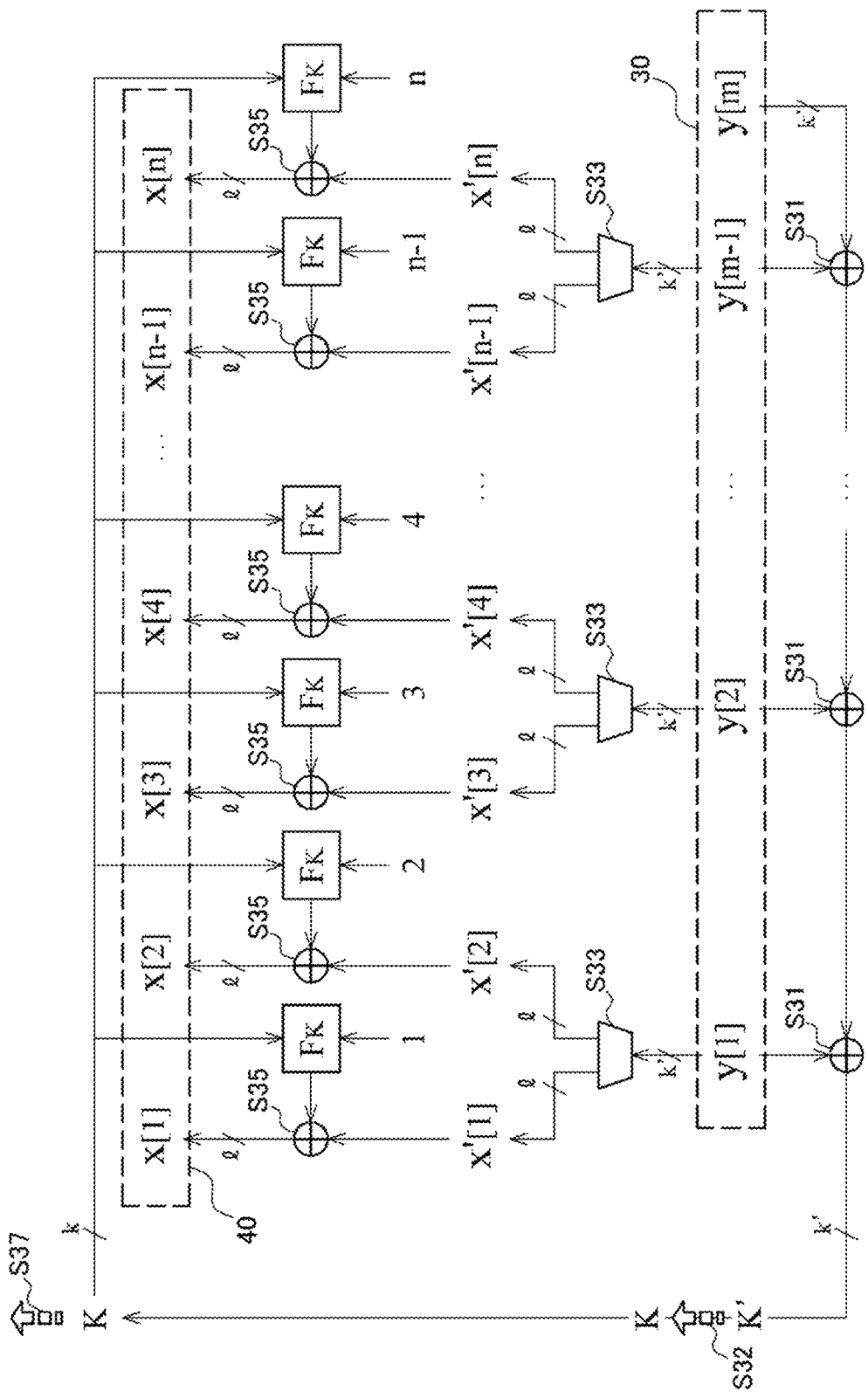
[Fig.5]

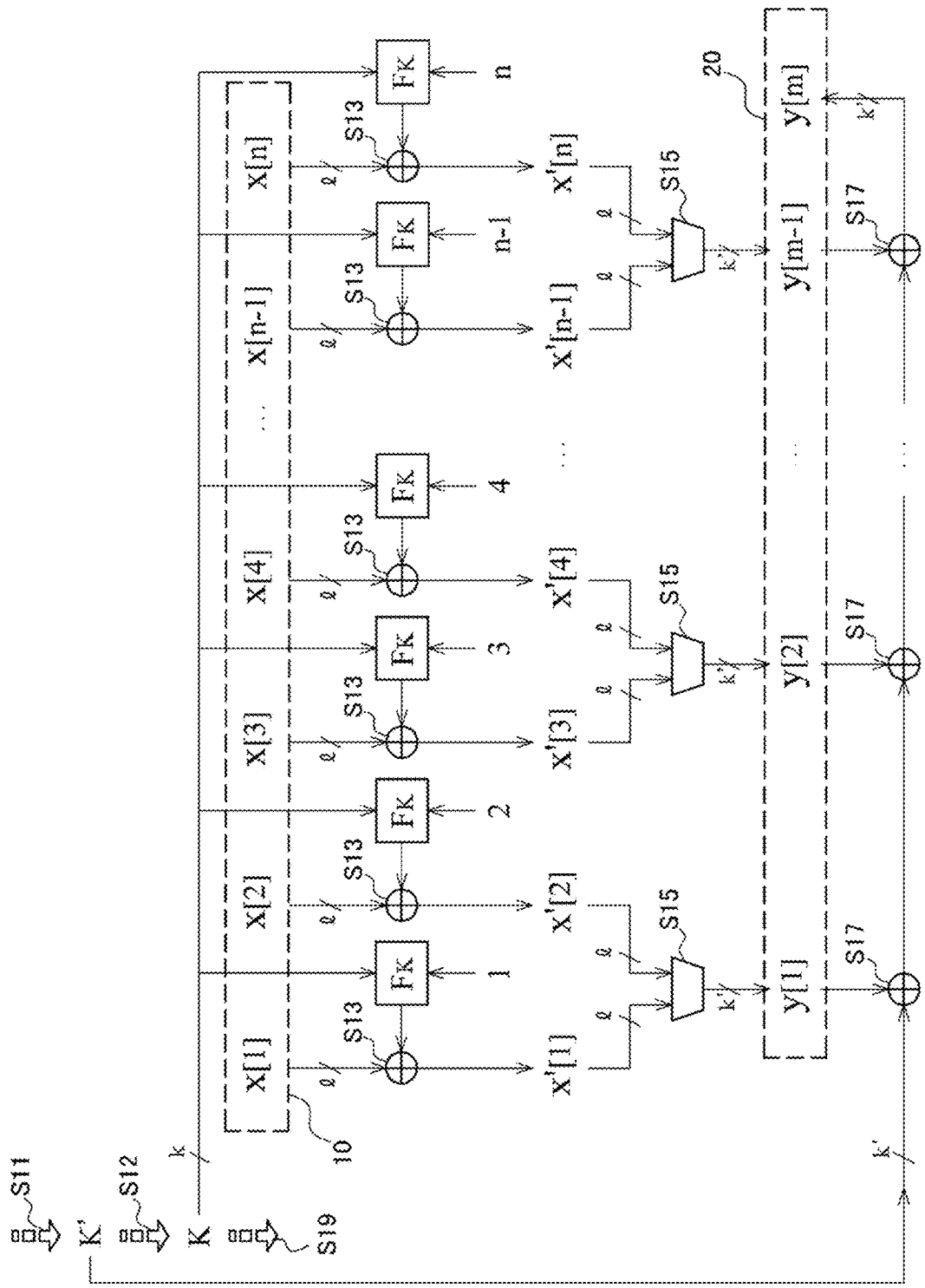

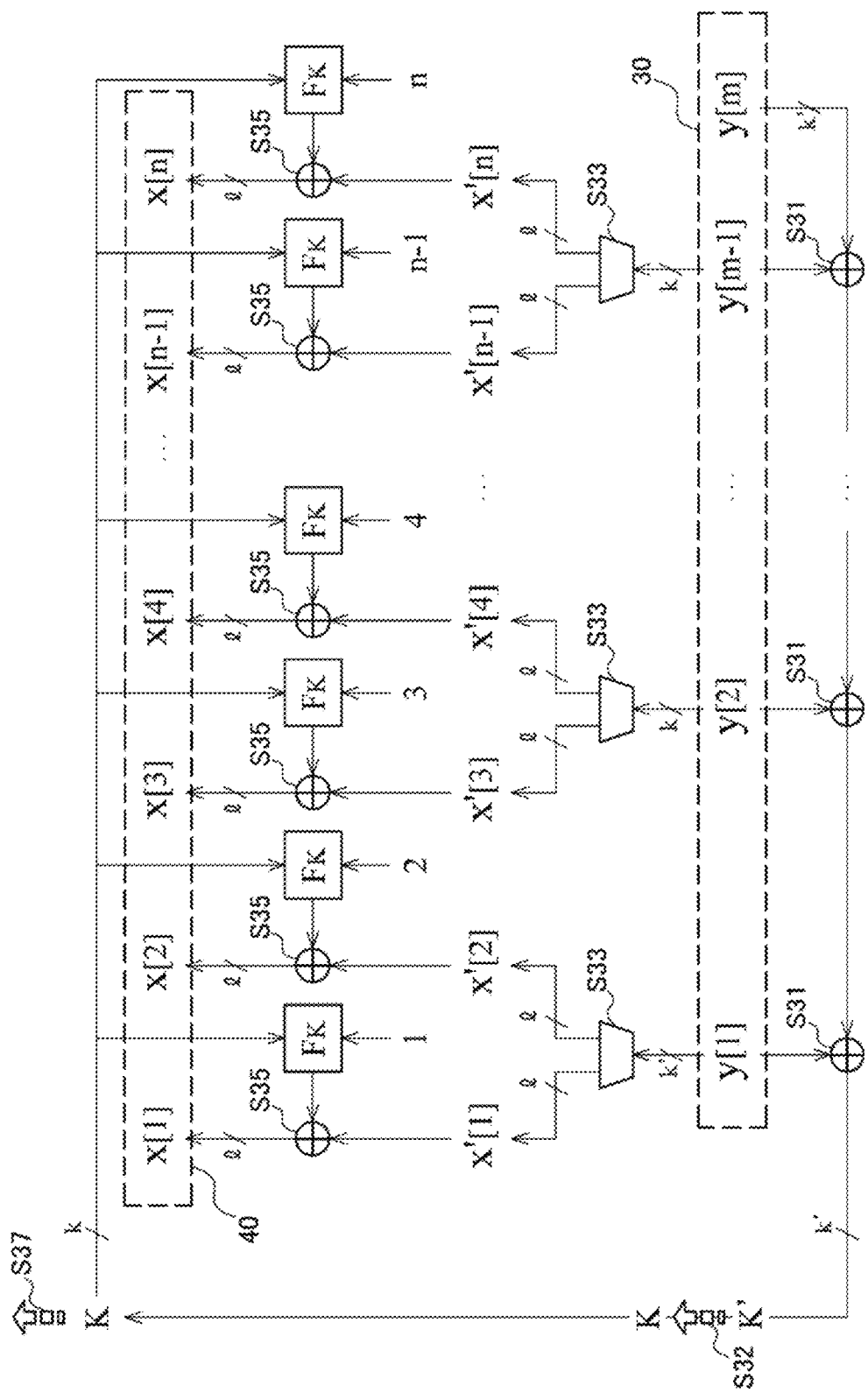
[Fig.7]

[Fig. 8A]
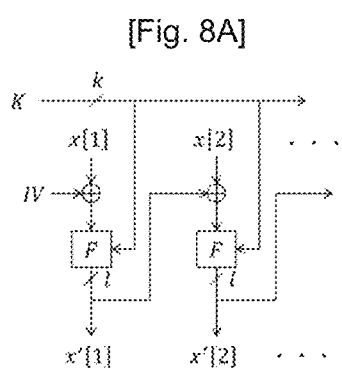
[Fig. 8B]
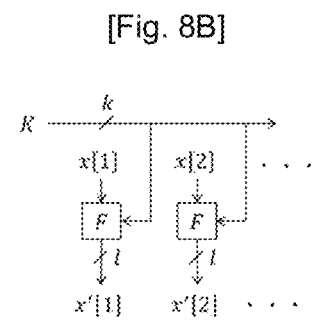
[Fig. 8C]
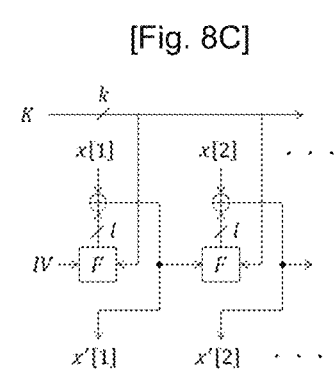

[Fig.9]
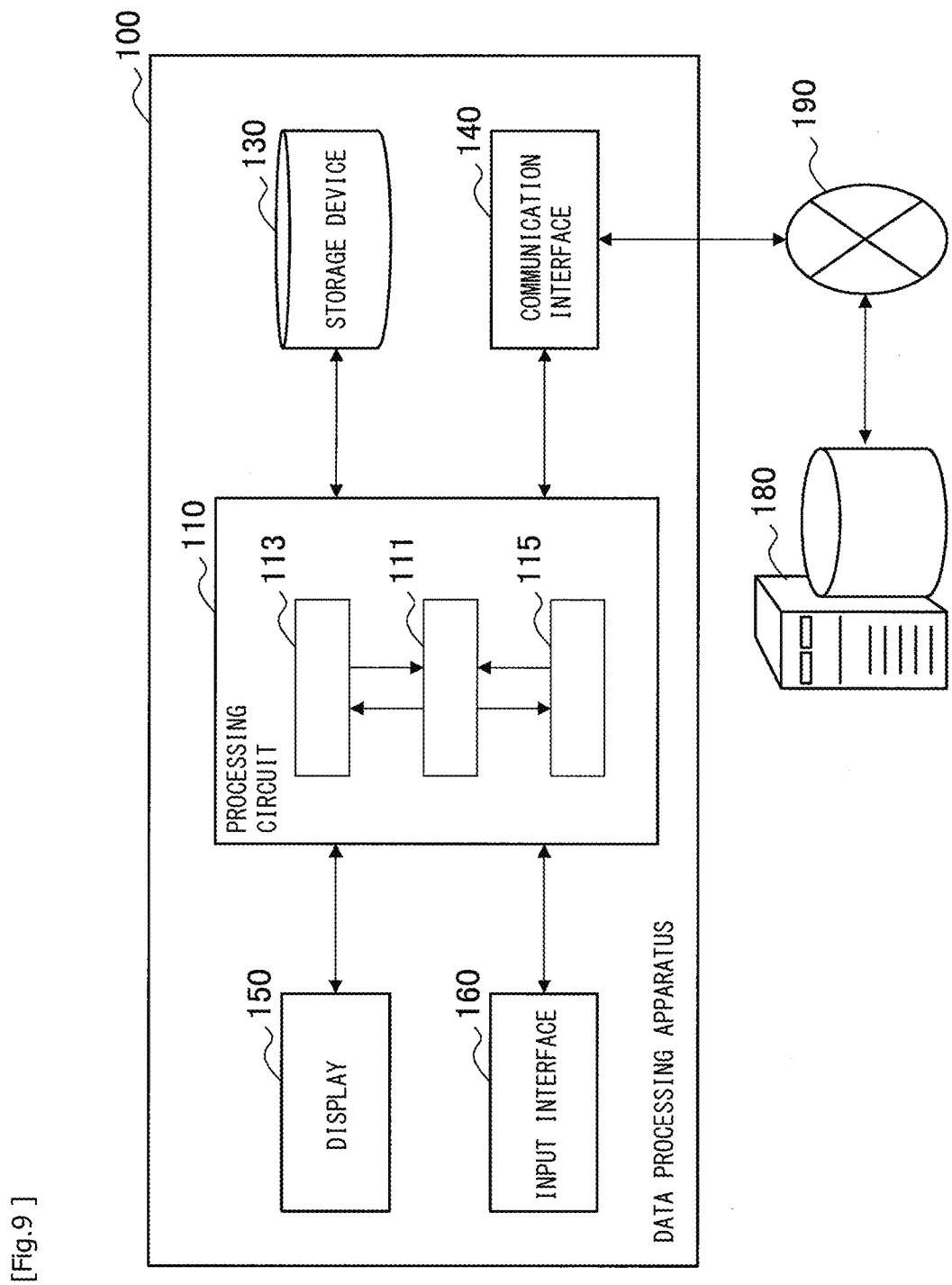

[Fig.10]
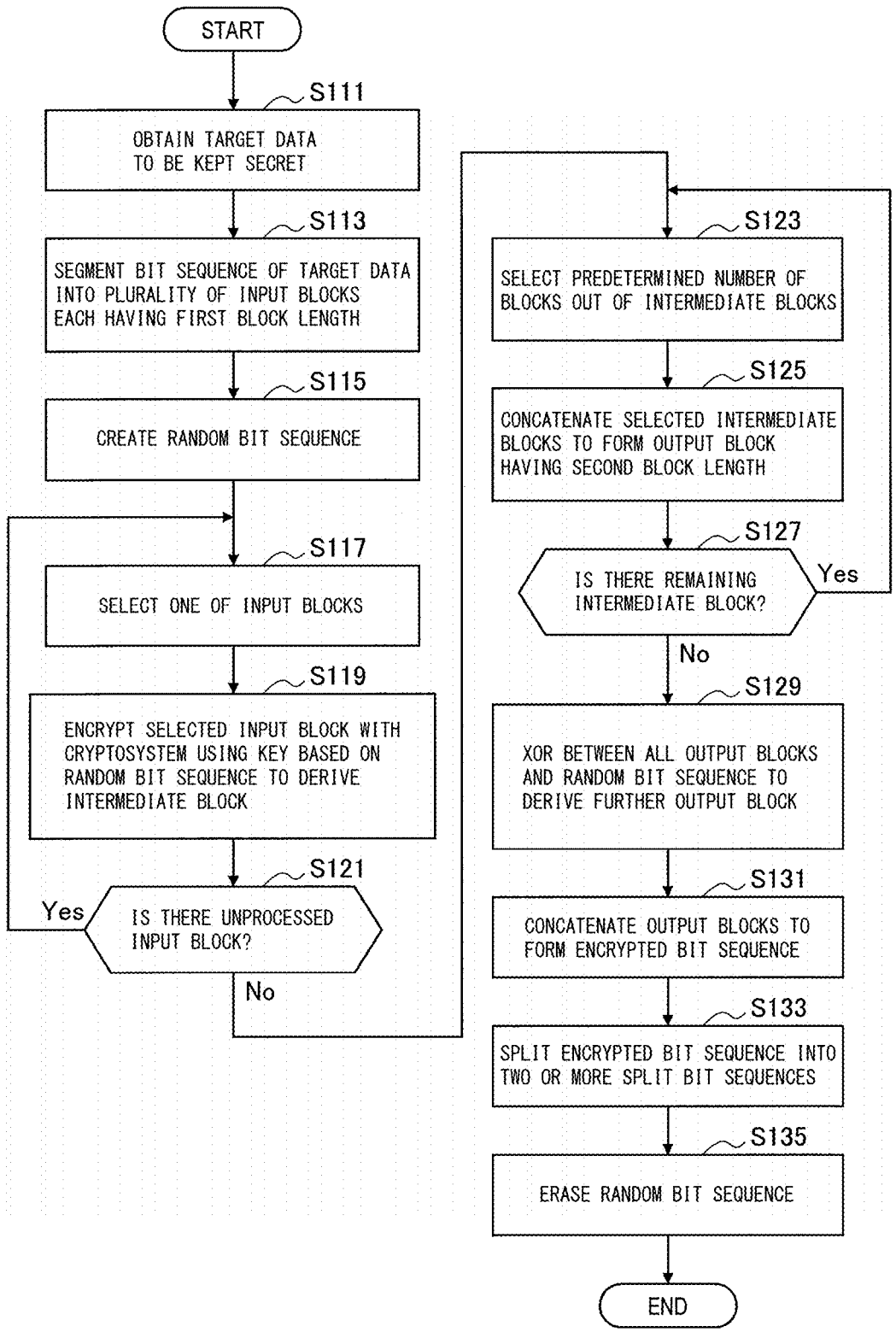

[Fig.11]
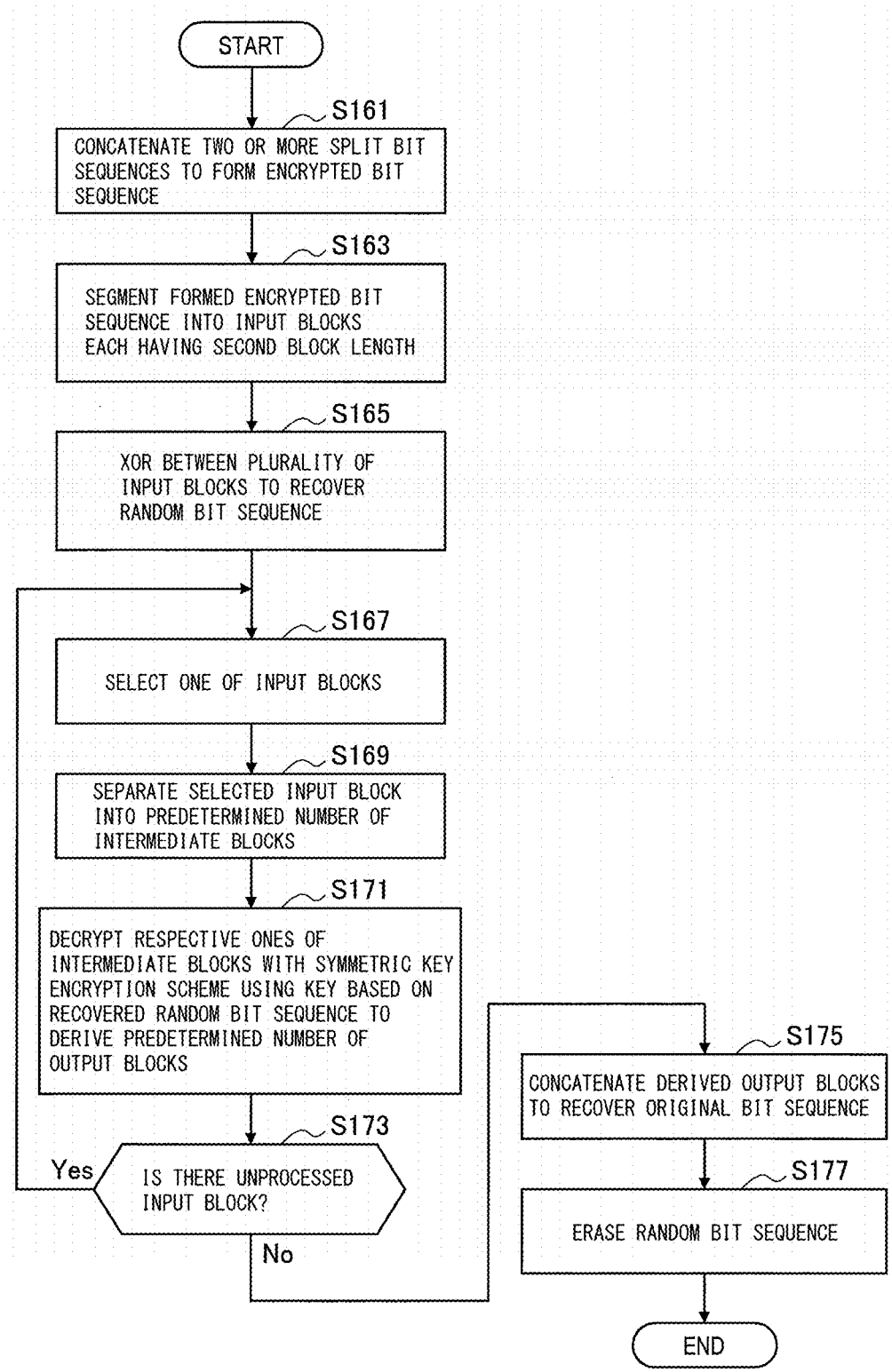

DATA PROCESSING DEVICE, METHOD, AND COMPUTER PROGRAM

RELATED APPLICATIONS

The present application is a national phase of International Application Number PCT/JP2019/020628, filed May 24, 2019, which claims priority to Japanese Application Number 2018-100539, filed May 25, 2018.

TECHNICAL FIELD

The present disclosure relates to a data processing apparatus, a method, and a computer program.

BACKGROUND ART

In general, in order to protect data from security risks, encryption using a password is utilized. However, it is difficult to maintain sufficient security against attacks such as cracking or social hacking only by simply encrypting information. It is impracticable to expect all users to keep their own passwords carefully. Hence, a secret splitting scheme has attracted attention. A secret splitting scheme is a technology which splits data into a plurality of fragments such that original data cannot be recovered unless a quorum or more of fragments (also referred to as shares) are put together.

According to a threshold splitting scheme, which is a typical example of a secret splitting scheme, a number of shares n can be an arbitrary integer equal to or larger than k, with k a quorum, but a data size will increase about n-fold through splitting. Meanwhile, according to an All Or Nothing Transform (AONT) scheme proposed in NPL 1, data is randomized (that is, transformed into a meaningless bit sequence) such that the whole original data cannot be recovered even when one small data block is missing, only with a slight increase in a total data size. Thus, by splitting data into n fragments after transformation, the AONT scheme can be treated as a variant of a secret splitting scheme with the quorum k equal to the number of shares n. The property of the AONT scheme of only slightly increasing a total data size facilitates utilization of a secret splitting scheme in a variety of modern systems or apparatuses that have limitations in resources from various viewpoints such as processing ability, communication performance, or storage capacity (for example, see PTL 1).

A Counter Transform (CTRT) scheme proposed in NPL 2 is one of transform algorithms to practice an AONT scheme. Secureness of the CTRT scheme is proven in NPL 2. Although the CTRT scheme requires data to be split in units of blocks instead of bits, it has high compatibility with computer implementation in that a block cipher can be reutilized to implement an AONT scheme. For example, an Optimal Asymmetric Encryption Padding (OAEP) scheme proposed in NPL 3, which is another transform algorithm, includes a process of which calculation cost is relatively large, such as expansion of a hash value. In contrast, the CTRT scheme, which does not include such a process, is superior from a viewpoint of faster processing.

CITATION LIST

Patent Literature

[PTL 1] JP 6221196 B2

Non Patent Literature

[NPL 1] R. Rivest, "All-or-Nothing Encryption and The Package Transform", FSE '97 Proceedings of Fast Software Encryption, pp. 210-218, 1997

[NPL 2] A. Desai, "The Security of All-Or-Nothing Encryption: Protecting Against Exhaustive Key Search", Advances in Cryptology—CRYPTO 2000, pp. 359-375, LNCS Vol. 1880, 2000

[NPL 3] V. Boyko, "On the Security Properties of OAEP as an All-or-Nothing Transform", Advances in Cryptology—CRYPTO 1999, pp. 503-518, LNCS Vol. 1666, 1999

SUMMARY

Technical Problem

In the CTRT scheme algorithm described in NPL 2, there is a restriction of $k \leq l$ on a block length l of data blocks and a key length k of a block cipher. For example, as for Data Encryption Standard (DES), which is one of conventional block cipher schemes, the block length $l=64$ bits and the key length $k=56$ bits, which meets this restriction. Meanwhile, as for Advanced Encryption Standard (AES), which has greater cipher strength than DES, the block length l is 128 bits and the key length k shall be selected from 128, 192, and 256 bits. This means that the AES key lengths of 192 bits and 256 bits, which are expected to provide more robust security, are unusable for the purpose of implementing the CTRT scheme since those key lengths are larger than the block length.

An object of a technology according to the present disclosure is to overcome or at least mitigate the above-described inconvenience pertaining to an existing AONT scheme.

Solution to Problem

According to the present disclosure, there is provided a data processing apparatus including a processing circuit configured to segment an original bit sequence into a plurality of input blocks, each input block having a first block length, create a random bit sequence with a bit length larger than the first block length, encrypt respective ones of the plurality of input blocks with a block cipher symmetric key encryption scheme using a key based on the created random bit sequence to derive a plurality of intermediate blocks, the key having a key length larger than the first block length, concatenate every predetermined number of intermediate blocks of the derived intermediate blocks to form one or more output blocks, each output block having a second block length that is equal to the bit length of the random bit sequence, compute an invertible transformation function on the one or more output blocks and the random bit sequence to derive a further output block having the second block length, and output an encrypted bit sequence including the one or more output blocks and the further output block.

According to the present disclosure, there is provided a method of transforming an original bit sequence into an encrypted bit sequence in a data processing apparatus, the method including segmenting the original bit sequence into a plurality of input blocks, each input block having a first block length, creating a random bit sequence with a bit length larger than the first block length, encrypting respective ones of the plurality of input blocks with a block cipher symmetric key encryption scheme using a key based on the created random bit sequence to derive a plurality of intermediate blocks, the key having a key length larger than the first block length, concatenating every predetermined number of intermediate blocks of the derived intermediate blocks to form one or more output blocks, each output block having a second block length that is equal to the bit length of the random bit sequence, computing an invertible transformation function on the one or more output blocks and the random bit sequence to derive a further output block having the second block length, and outputting the encrypted bit sequence including the one or more output blocks and the further output block.

According to the present disclosure, there is provided a computer program that causes, when executed by a processor of a data processing apparatus, the data processing apparatus to segment an original bit sequence into a plurality of input blocks, each input block having a first block length, create a random bit sequence with a bit length larger than the first block length, encrypt respective ones of the plurality of input blocks with a block cipher symmetric key encryption scheme using a key based on the created random bit sequence to derive a plurality of intermediate blocks, the key having a key length larger than the first block length, concatenate every predetermined number of intermediate blocks of the derived intermediate blocks to form one or more output blocks, each output block having a second block length that is equal to the bit length of the random bit sequence, compute an invertible transformation function on the one or more output blocks and the random bit sequence to derive a further output block having the second block length, and output an encrypted bit sequence including the one or more output blocks and the further output block.

According to the present disclosure, there is provided a data processing apparatus including a processing circuit configured to segment an encrypted bit sequence into a plurality of input blocks, each input block having a second block length larger than a first block length that is equal to a block length of a block cipher symmetric key encryption scheme, recover a random bit sequence utilized when transforming an original bit sequence into the encrypted bit sequence by computing an inverse transformation function of a transformation function on the plurality of input blocks, the transformation function utilized when transforming the original bit sequence into the encrypted bit sequence, separate one or more of the plurality of input blocks respectively into a predetermined number of intermediate blocks to form a plurality of intermediate blocks each having the first block length, decrypt respective ones of the plurality of intermediate blocks with the symmetric key encryption scheme using a key based on the recovered random bit sequence to derive a plurality of output blocks, and concatenate the derived output blocks to recover the original bit sequence.

According to the present disclosure, there is provided a method of inversely transforming an encrypted bit sequence into an original bit sequence in a data processing apparatus, the method including segmenting the encrypted bit sequence into a plurality of input blocks, each input block having a second block length larger than a first block length that is equal to a block length of a block cipher symmetric key encryption scheme, recovering a random bit sequence utilized when transforming the original bit sequence into the encrypted bit sequence by computing an inverse transformation function of a transformation function on the plurality of input blocks, the transformation function utilized when transforming the original bit sequence into the encrypted bit sequence, separating one or more of the plurality of input blocks respectively into a predetermined number of intermediate blocks to form a plurality of intermediate blocks each having the first block length, decrypting respective ones of the plurality of intermediate blocks with the symmetric key encryption scheme using a key based on the recovered random bit sequence to derive a plurality of output blocks, and concatenating the derived output blocks to recover the original bit sequence.

According to the present disclosure, there is provided a computer program that causes, when executed by a processor of a data processing apparatus, the data processing apparatus to segment an encrypted bit sequence into a plurality of input blocks, each input block having a second block length larger than a first block length that is equal to a block length of a block cipher symmetric key encryption scheme, recover a random bit sequence utilized when transforming an original bit sequence into the encrypted bit sequence by computing an inverse transformation function of a transformation function on the plurality of input blocks, the transformation function utilized when transforming the original bit sequence into the encrypted bit sequence, separate one or more of the plurality of input blocks respectively into a predetermined number of intermediate blocks to form a plurality of intermediate blocks each having the first block length, decrypt respective ones of the plurality of intermediate blocks with the symmetric key encryption scheme using a key based on the recovered random bit sequence to derive a plurality of output blocks, and concatenate the derived output blocks to recover the original bit sequence.

Advantageous Effects of Invention

According to the technology of the present disclosure, it is possible to mitigate a restriction on implementation of an existing AONT scheme, and achieve more robust security.

BRIEF DESCRIPTION OF DRAWINGS

FIG. 1 is a block diagram schematically representing an AONT transform algorithm of a modified CTRT scheme according to an embodiment;

FIG. 2 is an explanatory diagram for further explaining the AONT transform algorithm described in conjunction with FIG. 1 by focusing on a block length;

FIG. 3 is a block diagram schematically representing an inverse AONT transform algorithm of the modified CTRT scheme according to an embodiment;

FIG. 4 is a block diagram schematically representing an AONT transform algorithm of an extended modified CTRT scheme (part 1) according to an embodiment;

FIG. 5 is a block diagram schematically representing an inverse AONT transform algorithm of the extended modified CTRT scheme (part 1) according to an embodiment;

FIG. 6 is a block diagram schematically representing an AONT transform algorithm of an extended modified CTRT scheme (part 2) according to an embodiment;

FIG. 7 is a block diagram schematically representing an inverse AONT transform algorithm of the extended modified CTRT scheme (part 2) according to an embodiment;

FIGS. 8A to 8C are diagrams for explaining the modified CTRT scheme in a CBC mode, an ECM mode, and a CFB mode;

FIG. 9 is a block diagram showing an exemplary configuration of a data processing apparatus according to an embodiment;

FIG. 10 is a flowchart showing an exemplary flow of a method for AONT transform according to an embodiment; and FIG. 11 is a flowchart showing an exemplary flow of a method for inverse AONT transform according to an embodiment.

DESCRIPTION OF EMBODIMENTS

Hereinafter, preferred embodiments of the present disclosure will be described in detail with reference to the appended drawings. In the present specification and the drawings, constituent elements that have substantially the same function or configuration are denoted with the same reference signs, and thereby duplicate explanations are omitted.

Descriptions will be given in the following order:
1. Introduction
1-1. AONT Scheme
1-2. Existing Algorithm
1-3. Description of Issues
2. New Technique
2-1. Modified Algorithm
2-2. Generalization of Algorithm
3. Configuration Example of Data Processing Apparatus
4. Flows of Processes
4-1. AONT Transform
4-2. Inverse AONT Transform
5. Conclusion

1. INTRODUCTION

[1-1. AONT Scheme]

In NPL 1, Rivest suggests that, in order to assert that a transformation f which maps a message sequence (a sequence of message blocks) to a pseudo message sequence is AONT, it should satisfy following three conditions:

The transformation f has an inverse transformation. That is, given a pseudo message sequence, an original message sequence can be recovered;

The transformation f and its inverse transformation are computable within polynomial time; and Unless all pseudo message blocks are known, it is unfeasible to recover any one of original message blocks due to computational complexity.

There are some transform algorithms that satisfy these conditions for AONT, such as the CTRT scheme proposed in NPL 2 and the OAEP scheme proposed in NPL 3. The OAEP scheme has an advantage of high flexibility in splitting a message since it allows bitwise operation, but includes a process of which calculation cost is relatively large, such as expansion of a hash value. Meanwhile, the CTRT scheme requires data to be split in units of blocks instead of bits. However, it has high compatibility with computer implementation since a block cipher can be reutilized to implement an AONT scheme, and is superior from a viewpoint of faster processing. Secureness of the CTRT scheme is proven in NPL 2.

[1-2. Existing Algorithm]

Section 5 "All-Or Nothing Transforms" in NPL 2 describes a transform algorithm for transforming a message, i.e., a bit sequence of data to be kept secret, and an inverse transform algorithm for recovering the original bit sequence, in accordance with the CTRT scheme. Table 1 below shows an algorithm substantially the same as that transform algorithm.

TABLE 1

Transform Algorithm of
CTRT Scheme (from NPL 2)

Input: $x[1]\| \ldots \|x[n]$
  $K' \leftarrow \{0,1\}^l$
  $K = K' \bmod 2^k$ // $|K| = k$
  for $i = 1, \ldots, n$ do
    $x'[n + 1] = x[i] \oplus F_K(i)$
  end for
  $x'[n + 1] = K' \oplus x'[1] \oplus \ldots \oplus x'[n]$
Output: $x'[1]\| \ldots \|x'[n + 1]$ Line 1 in Table 1 shows that a bit sequence input to the algorithm is segmented into n input blocks $x[1], \ldots, x[n]$. Each input block has a block length equal to l. In Line 2, a random bit sequence K' having a bit length l is created. In Line 3, a key K having a key length k is derived as a remainder of the random bit sequence K' when divided by the k-th power of 2. In Lines 4 to 6, each of the n input blocks $x[1], \ldots, x[n]$ is encrypted with some (ideal) cryptosystem $F_K$ using the key K. Encrypted blocks $x'[1], \ldots, x'[n]$ are referred to as output blocks here. In Line 7, a further output block $x'[n+1]$ is derived by computing exclusive OR (XOR) between the random bit sequence K' and the output blocks $x'[1], \ldots, x'[n]$. In Line 8, a series of the output blocks $x'[1], \ldots, x'[2], \ldots, x'[n], x'[n+1]$ is output as an encrypted bit sequence.

Table 2 below shows an algorithm substantially the same as the inverse transform algorithm described in Section 5 in NPL 2.

TABLE 2

Inverse Transform Algorithm of
CTRT Scheme (from NPL 2)

Input: $x'[1]\| \ldots \|x'[n]$
  $K' = x'[1] \oplus \ldots \oplus x'[n + 1]$
  $K = K' \bmod 2^k$ // $|K| = k$
  for $i = 1, \ldots, n$ do
    $x[i] = x'[i] \oplus F_K(i)$
  end for
Output: $x[1]\| \ldots \|x[n]$ Line 1 in Table 2 shows that an encrypted bit sequence input to the algorithm is segmented into n+1 input blocks $x'[1], \ldots, x'[n+1]$. Each input block has a block length equal to l. In Line 2, the random bit sequence K' utilized when transforming the original bit sequence into the encrypted bit sequence is recovered by XORing between the input blocks $x'[1], \ldots, x'[n+1]$. In Line 3, the key K having the key length k is derived as a remainder of the random bit sequence K' when divided by the k-th power of 2. In Lines 4 to 6, each of the n input blocks $x'[1], \ldots, x'[n]$ is decrypted with the cryptosystem $F_K$ using the key K. Decrypted blocks $x[1], \ldots, x[n]$ are referred to as output blocks here. In Line 7, a series of the output blocks $x[1], \ldots, x[n]$ is output as the recovered original bit sequence.

As understood from the descriptions of Tables 1 and 2, the CTRT scheme creates a key having a key length k during the process of transforming data to be kept secret, and encrypts each message block with a symmetric key encryption scheme $F_K$ using the created key. In a CTR mode, practically, a counter value that varies from a block to another is encrypted with the symmetric key encryption scheme, and each message block is also encrypted by XORing between the encrypted counter value and that message block. The key will be kept secret by dispersing it over the whole message through further XORing with the encrypted blocks. Any single block out of the obtained bit sequence x'[1], . . . , x'[n+1] is essential for recovering the original bit sequence, and even when one block is missing, the original bit sequence cannot be recovered. The whole output bit sequence consisting of these blocks is split into a plurality of fragments such that each fragment contains at least one block, and the fragments are stored in respective different (secure) storages, for example. Then, if security of one of the storages is broken, the original data is not leaked to an adversary. Further, a user who owns the data has no need to keep the encryption key for himself.

[1-3. Description of Issues]

In the transform/inverse transform algorithm of the CTRT scheme described in the previous subsection, there is a restriction of $k \leq l$ on the block length l and the key length k of the block cipher. This restriction is needed, for example, for performing exclusive OR with the blocks to disperse the key K over the whole message and thereby keep it secret. For example, as for DES, which is one of typical block cipher schemes, the block length l=64 bits and the key length k=56 bits, which meets this restriction. Thus, DES can be utilized for implementing the existing CTRT scheme. However, the cipher strength of a symmetric key encryption scheme (also known as a common key cryptosystem) generally depends on the key length. For example, the DES key length of 56 bits is too short and, assuming drastically increased modern computer performance, DES is said to be no longer indecipherable within practical time even by a brute-force attack.

Meanwhile, the above-described restriction on the block length l and the key length k may hamper an idea of, when implementing the CTRT scheme, utilizing a block cipher with a larger key length to improve the cipher strength. For example, as for AES, which is a symmetric key encryption scheme also known as a Rijndael cipher, the block length l is 128 bits, and the key length k shall be selected from 128, 192, and 256 bits. Since the AES key lengths of 192 bits and 256 bits, which are expected to provide great cipher strength, are larger than the AES block length, those key lengths are unable to be employed in the transform/inverse transform algorithm of the CTRT scheme.

In light of the foregoing, in the embodiments described in detail in the following sections, the transform/inverse transform algorithm of the CTRT scheme is modified so as to allow for employing a key length larger than a block length of a block cipher.

2. NEW TECHNIQUE

[2-1. Modified Algorithm]

In the following description, a technique based on the CTRT scheme modified so as to allow for employing a key length k larger than a block length l is referred to as a modified CTRT scheme. Table 3 below shows an exemplary transform algorithm for AONT-transforming an original bit sequence in accordance with the modified CTRT scheme. FIG. 1 is a block diagram schematically representing the transform algorithm of Table 3.

TABLE 3

Transform Algorithm of Modified
CTRT Scheme (in the case of k = 2l)

Input: x[1]|| ... ||x[n]
K ← {0,1}$^l$
for i = 1, ... , n do
  x'[i] = x[i] ⊕ $F_K$(i)
end for
for j = 1, ... , m − 1 do
  y[j] = x'[2j − 1]||x'[2j]
end for
y[m] = K ⊕ y[1] ⊕ ... ⊕ y[m − 1]
Output: y[1]|| ... ||y[m]

As shown in Line 1 in Table 3, first, an original bit sequence, i.e., a bit sequence of data to be kept secret, is segmented into a plurality of input blocks x[1], . . . , x[n] each having a first block length. The first block length is equal to a block length l specific to a block cipher symmetric key encryption scheme utilized in the following steps. When AES is utilized as the symmetric key encryption scheme, l=128 bits. The upper portion of FIG. 1 shows that an input message 10 is segmented into n input blocks. When the input message 10 has a size other than an integral multiple of the first block length, for example, one or more padding bits may be appended to the end of the input message 10 such that each of the n input blocks has a size equal to the first block length. Further, padding for making the number of intermediate blocks described below a predetermined number may also be performed here at the same time. Especially, it is desirable that padding bits for the latter padding in units of blocks have random bit values.

Next, as shown in Line 2 in Table 3, a random bit sequence K having a bit length k is created as a key K for the symmetric key encryption. The creation of the key K is denoted by step S11 in FIG. 1. Here, let k=2l. When AES is utilized as the symmetric key encryption scheme, k=256 bits can be selected, with k a key length.

Next, as shown in Lines 3 to 5 in Table 3, each of the input blocks x[1], . . . , x[n] is encrypted in the CTR mode with the block cipher symmetric key encryption scheme using the key K based on the created random bit sequence, and thus a plurality of intermediate blocks x'[1], . . . , x'[n] are derived. In FIG. 1, the encryption of each block under the key K is represented as an exclusive OR operation with a counter value encrypted with a function $F_K$ in step S13.

Next, as shown in Lines 6 to 8 in Table 3, every two intermediate blocks of the derived intermediate blocks x'[1], . . . , x'[n] are concatenated, and thus one or more output blocks y[1], . . . , y[m−1] each having a second block length are formed. Here, the second block length is equal to twice the first block length (i.e., 2l), and is equal to the key length of the key K (i.e., k). In FIG. 1, two consecutive blocks out of a series of the intermediate blocks are concatenated together in step S15. For example, intermediate blocks x'[1] and x'[2] each having l bits are concatenated to form a first output block y[1], and similarly, intermediate blocks x'[3] and x'[4] are concatenated to form a second output block y[2]. When the number n of the intermediate blocks is odd, a padding block may be appended here as the last intermediate block.

Next, as shown in Line 9 in Table 3, a further output block y[m] is derived by XORing between the m−1 output blocks y[1], . . . , y[m−1] and the created random bit sequence (here, equal to the key K). The output block y[m] has a size equal to the above-described second block length. The derivation of the output block y[m] is denoted by step S17 in FIG. 1.

Next, as shown in Line 10 in Table 3, the encrypted bit sequence including a series of the output blocks y[1], ..., y[m] is output. FIG. 1 shows that an output message 20 including the output blocks y[1], ..., y[m−1] and the further output block y[m] is formed.

Finally, although not shown in Table 3, the key K created during the process of the data transformation is erased. The erasure of the key K is denoted by step S19 in FIG. 1. This transformed encrypted bit sequence is split into two or more split bit sequences each containing at least one of the output blocks y[1], ..., y[m], and the split bit sequences are stored in different storage devices, for example.

FIG. 2 is an explanatory diagram for further explaining the AONT transform algorithm described in conjunction with FIG. 1 by focusing on the block length. Herein, let AES be utilized as the symmetric key encryption scheme, the block length l=128 bits, and the key length k=256 bits. The top alignment of FIG. 2 shows a series of the input blocks x[1], ..., x[n] each having the first block length l. These input blocks constitute data or a message to be kept secret. Each of the input blocks x[1], ..., x[n] is encrypted in the CTR mode with AES using the key K having the key length k=256 (=2l) bits, and a series of the intermediate blocks x'[1], ..., x'[n] shown in the second alignment of FIG. 2 is derived. Each intermediate block also has the first block length. Next, every two intermediate blocks of the series of the intermediate blocks x'[1], ..., x'[n] are concatenated together, and thus the m−1 output blocks y[1], ..., y[m−1] shown in the third alignment of FIG. 2 are formed. Each output block has the second block length (k=2l). Further, in the fourth alignment of FIG. 2, the further output block y[m] is appended to the end of the output blocks y[1], ..., y[m−1]. The output block y[m] is exclusive OR between the output blocks y[1], ..., y[m−1] and the key K, and has a size equal to the second block length (k=2l). Then, in the bottom alignment of FIG. 2, the encrypted bit sequence including all the output blocks y[1], ..., y[m] is split into two or more fragments FG1, FG2, .... A smallest fragment among these fragments has a size g equal to or larger than the output block size k (2l=k≤g). Any fragment includes at least one of the output blocks. As a result, even if an adversary obtains all these fragments but any single one, neither the original message nor the key K are substantially leaked.

Table 4 below shows an exemplary inverse transform algorithm for inversely AONT-transforming an encrypted bit sequence (recovering an original bit sequence) in accordance with the modified CTRT scheme. FIG. 3 is a block diagram schematically representing the inverse transform algorithm of Table 4.

TABLE 4

Inverse Transform Algorithm of Modified
CTRT Scheme (in the case of k = 2l)

Input: y[1]|| ... ||y[m]
K = y[1] ⊕ ... ⊕ y[m]
for j = 1, ... , m − 1 do
   Parse y[j] as x'[2j − 1], x'[2j]
end for
for i = 1, ... , n do
   x[i] = x'[i] ⊕ $F_K(i)$
end for
Output: x[1]|| ... ||x[n]

An encrypted bit sequence is obtained typically by concatenating two or more split bit sequences stored in respective different storage devices. As shown in Line 1 in Table 4, first, the encrypted bit sequence is segmented into a plurality of input blocks y[1], ..., y[m] each having a second block length twice a first block length. The first block length is equal to a block length specific to a block cipher symmetric key encryption scheme. Herein, let AES be utilized as the symmetric key encryption scheme, the first block length be 128 bits, and the second block length be 256 bits. The lower portion of FIG. 3 shows that an encrypted message 30 is segmented into m input blocks.

Next, as shown in Line 2 in Table 4, a key K corresponding to a random bit sequence is recovered by XORing between the m input blocks y[1], ..., y[m]. Herein, the key K has a key length k equal to the above-described second block length. The recovery of the key K is denoted by step S31 in FIG. 3.

Next, as shown in Lines 3 to 5 in Table 4, one or more input blocks y[1], ..., y[m−1] are each separated into two blocks of equal size, and thus a plurality of intermediate blocks x'[1], ..., x'[n] each having the first block length are formed. In FIG. 3, each input block is separated into two consecutive intermediate blocks in step S33. For example, a first input block y[1] is separated into intermediate blocks x'[1] and x'[2], and a second input block y[2] is separated into intermediate blocks x'[3] and x'[4]. When the last intermediate block is a padding block, it may be deleted here.

Next, as shown in Lines 6 to 8 in Table 4, each of the intermediate blocks x'[1], ..., x'[n] is decrypted in the CTR mode with the block cipher symmetric key encryption scheme using the key K based on the recovered random bit sequence, and thus a plurality of output blocks x[1], ..., x[n] are derived. In FIG. 3, the decryption of each block under the key K is represented as an exclusive OR operation in step S35.

Next, as shown in Line 9 in Table 4, the original bit sequence including a series of the output blocks x[1], ..., x[n] is output. The upper portion of FIG. 3 shows that the original bit sequence 40 is formed by concatenating the output blocks x[1], ..., x[n].

Finally, although not shown in Table 4, the key K created during the process of the inverse transformation is erased. The erasure of the key K is denoted by step S37 in FIG. 3.

[2-2. Generalization of Algorithm]

The algorithms schematically shown in FIGS. 1 to 3 are applicable to the case where the relationship of k=2l holds between the block length l and the key length k. For example, when AES is utilized as the symmetric key encryption scheme and 256 bits (k=256) is selected as the AES key length, the relationship of k=2l holds since the block length specific to AES (i.e., message block length) is 128 bits (l=128). This means that the above-described modified CTRT scheme is applicable to the case of using the longest key length in AES that is sufficiently computationally secure for the moment.

Additionally, extension of the modified CTRT scheme allows for addressing various cases where the block length l and the key length k has a relationship other than k=2l.

For example, let the key length k be q times (q is an integer equal to or larger than two) the first block length l (k=ql). In this case, when transforming an original bit sequence, by concatenating every q intermediate blocks of the encrypted intermediate blocks x'[1], ..., x'[n], one or more output blocks each having the second block length q times the first block length l are formed. This makes it possible to XOR between these output blocks and the key K having the key length k=ql to keep the key K secret. When performing the inverse transformation, after recovering the key K having the key length equal to the second block length (k=ql) through XORing between the input blocks, by separating each input block into q consecutive intermediate blocks, a plurality of intermediate blocks each having the first block length l can be formed. The first block length l is a block length specific to the symmetric key encryption scheme to be utilized.

Furthermore, for example, if the key length k of the key to be used for encrypting each block is not an integral multiple of the block length l, for example, the modified CTRT scheme can be extended by a method described below.

In a case where the block length l is 128 bits and the key length k is 192 bits, for example, when AONT-transforming an original bit sequence, as shown in FIG. 4, a 256-bit random bit sequence K' is created by concatenating 64-bit padding P with the subsequent 192-bit key K (K'=P∥K) in step S16 before performing an exclusive OR operation with the output block y[1] in step S17. In this case, the key K and the padding P can be determined at random. The exclusive OR operation is then performed in step S17 between the 256-bit random bit sequence K' created in step S16 and the 256-bit output blocks y[1]. In this way, the modified CTRT scheme according to the present invention can be extended to be applicable to even the case where the key length k of the key K is not an integral multiple of the block length l.

When performing inverse AONT transform on an encrypted bit sequence, as shown in FIG. 5, the 256-bit random bit sequence K, which is the concatenation of the 192-bit key K and the 64-bit padding P, can be recovered by an exclusive OR operation between input blocks y[1], . . . , y[m] in step S31. In step S32, the 192-bit key K is recovered by removing the 64-bit padding P from the recovered 256-bit random bit sequence K'. Then, the recovered key K is used on intermediate blocks x'[1], . . . , x'[n], and output blocks x[1], . . . , x[n] can thus be output.

In these methods, a random bit sequence K' is created by concatenating a padding P with the subsequent key K (K'=P∥K). However, this is not a limitation, and a random bit sequence K' may be created by concatenating the key K with a subsequent padding P (K'=K∥P).

In another method, as shown in FIG. 6, first, a random bit sequence K' with a bit length that is equal to an integral multiple of the block length l and larger than the key length k is created in step S11. In step S12, a key K with a smaller size may be created based on the random bit sequence K' and used for encryption (or decryption) of each block. For example, in a case where the block length l is 128 bits and the key length k is 192 bits, first, a 256-bit random bit sequence K' is created in step S11. In step 12, a 192-bit subsequence out of subsequences of the 256-bit random bit sequence K' is created as the key K. Thus, the 192-bit key K can be used when input blocks x[1], . . . , x[n] are encrypted in step S13. When performing an exclusive OR operation with the output blocks y[1] in step S17, the random bit sequence K' of 256 bits, which is an integral multiple of the block length l, can be used. Note that, in the case of creating a subsequence of the random bit sequence K' as the key K, the key K can be a remainder of K' when divided by $2^k$, for example.

When performing inverse AONT transform on an encrypted bit sequence, as shown in FIG. 7, the 256-bit random bit sequence K' is recovered by XORing between input blocks y[1], . . . , y[m] in step S31. Then, in step S32, the subsequence of the 256-bit K' can be created as the 192-bit key K by performing a modulo operation on the recovered random bit sequence K. Then, the recovered key K is used on intermediate blocks x'[1], . . . , x'[n], and output blocks x[1], . . . , x[n] can thus be output.

Note that, if the key K is created as the remainder of K' when divided by $2^k$ in FIGS. 6 and 7, K will be the same as the value of the least significant k bits extracted from K'. That is, the values created for K in the method shown in FIGS. 6 and 7 and in the method shown in FIGS. 4 and 5 (the method in which the random bit sequence K' is a concatenation of the key K and a preceding padding P) will be the same given that K' is the same, though the operational procedures are different. However, it can be said that the method shown in FIGS. 6 and 7 is preferable owing to a smaller amount of calculation in comparison with the method shown in FIGS. 4 and 5.

A combination with such generalization techniques makes it possible to remove the restriction of k≤l on the block length l and the key length k inherent in the existing CTRT scheme, and to use an optimum cryptosystem and key length depending on various conditions such as cipher strength, processing speed, or communication environment. The technology according to the present disclosure may be applied to a case where another cipher operation mode, such as a Cipher Block Chaining (CBC) mode, an Electronic CodeBook (ECB) mode, a Cipher FeedBack (CFB) mode, and an Output FeedBack (OFB) mode, is utilized instead of the above-described CTR mode. In the CBC mode, it is possible to perform AONT transform/inverse AONT transform by the modified CTRT scheme in a similar way to that in the CTR mode described above except that the portion denoted by VIII in FIGS. 1 and 3 is changed as shown in FIG. 8A. In the ECB mode or the CFB mode, it is possible to perform AONT transform/inverse AONT transform by the modified CTRT scheme in a similar way to that in the CTR mode described above except that the portion denoted by VIII in FIGS. 1 and 3 is changed as shown in FIG. 8B or FIG. 8C, respectively. Similarly, also in the OFB mode, it is possible to perform AONT transform/inverse AONT transform by the modified CTRT scheme.

Furthermore, in the above-described examples, a configuration utilizing AES as the key cryptosystem is shown as an example. However, the technology according to the present disclosure is not limited to AES, and any block cipher (symmetric key encryption) can be utilized, such as Triple DES, MISTY1, and Camellia, in which a block length l and a key length k satisfying k>l can be selected.

3. CONFIGURATION EXAMPLE OF DATA PROCESSING APPARATUS

FIG. 9 is a block diagram showing an exemplary configuration of a data processing apparatus 100 according to an embodiment. With reference to FIG. 9, the data processing apparatus 100 includes a processing circuit 110, a storage device 130, a communication interface 140, a display 150, and an input interface 160.

The processing circuit 110 may include one or more general-purpose processors such as, for example, a Central Processing Unit (CPU) or a Micro Processing Unit (MPU). The processing circuit 110 may include, for example, a circuit specifically designed for AONT transform/inverse AONT transform, such as an Application Specific Integrated Circuit (ASIC) or a Field Programmable Gate Array (FPGA).

The storage device 130 is a device for storing data, control parameters, and computer programs needed for operation of the data processing apparatus 100. The storage device 130 may include a non-volatile storage medium (for example, a Read Only Memory (ROM)) and a volatile storage medium (for example, a Random Access Memory (RAM)). The storage device 130 may further include a Hard Disk Drive (HDD) or a Solid State Drive (SSD). The control parameters stored in the storage device 130 may include, for example, identification information of available encryption schemes, selectable key lengths, storage locations of split fragments, and the like.

The communication interface 140 is an interface for communication with another apparatus by the data processing apparatus 100. The communication interface 140 may include a wired LAN interface, a wireless LAN (also referred to as Wi-Fi) interface, a cellular communication interface, or the like. In the example of FIG. 9, the communication interface 140 is connected to an external storage 180 via a network 190.

The display 150 is a display device such as, for example, a Liquid Crystal Display (LCD) or an Organic Light-Emitting Diode (OLED) display. The display 150 displays, for example, information to be provided to a user by the data processing apparatus 100 on a screen.

The input interface 160 is an interface used by a user to operate the data processing apparatus 100 or to input information to the data processing apparatus 100. The input interface 160 may include any type of interface such as, for example, a touch sensor, a keypad, a keyboard, a button, a switch, or a pointing device.

The processing circuit 110 activates functionalities of the data processing apparatus 100, for example, by executing computer programs stored in a computer-readable storage medium of the storage device 130. For example, the data processing apparatus 100 includes a data input/output module 111, a transformation module 113, and an inverse transformation module 115 as logical functional modules.

When there is a request for keeping target data secret, the data input/output module 111 obtains a bit sequence of the target data (i.e., an original bit sequence), for example, by reading it from the storage device 130 or receiving it via the communication interface 140 in accordance with a user instruction. Then, the data input/output module 111 outputs the obtained original bit sequence to the transformation module 113. When the transformation module 113 successfully transforms the original bit sequence into an encrypted bit sequence, the data input/output module 111 splits the encrypted bit sequence into two or more split bit sequences. Each of the split bit sequences contains at least one output block having the above-described second block length. The data input/output module 111 outputs the two or more split bit sequences to store them in respective corresponding storages (for example, the storage device 130 or the external storage 180).

Furthermore, when there is a request for recovering the target data, the data input/output module 111 collects split fragments associated with the target data from respective corresponding storages, and outputs an encrypted bit sequence formed by concatenating the collected split fragments to the inverse transformation module 115. When the inverse transformation module 115 successfully recovers the original bit sequence from the encrypted bit sequence, the data input/output module 111, for example, provides the recovered original bit sequence to the storage device 130 or the display 150, or transmits it to another apparatus via the communication interface 140 in accordance with a user instruction.

When the transformation module 113 receives an input of the original bit sequence to be AONT-transformed from the data input/output module 111, it transforms the original bit sequence into an encrypted bit sequence in accordance with the above-described modified CTRT scheme, and returns the encrypted bit sequence to the data input/output module 111. An example of specific flows of processes executed by the transformation module 113 will be described in detail in the next section.

When the inverse transformation module 115 receives an input of the encrypted bit sequence to be inversely AONT-transformed from the data input/output module 111, it inversely transforms the encrypted bit sequence in accordance with the above-described modified CTRT scheme to recover an original bit sequence, and returns the original bit sequence to the data input/output module 111. An example of specific flows of processes executed by the inverse transformation module 115 will be described in detail in the next section.

4. FLOWS OF PROCESSES

[4-1. AONT Transform]

FIG. 10 is a flowchart showing an exemplary flow of a method for AONT transform that may be executed by the data processing apparatus 100 according to an embodiment.

First, the data input/output module 111 obtains target data to be kept secret (step S111). Then, the data input/output module 111 outputs the obtained target data to the transformation module 113.

Next, the transformation module 113 segments a bit sequence of the target data into a plurality of input blocks each having a first block length (step S113). The first block length is equal to a block length specific to a block cipher symmetric key encryption scheme.

Next, the transformation module 113 creates a random bit sequence with a bit length equal to an integral multiple of the first block length (step S115). Note that the "random" bit sequence in the present specification may include a bit sequence with each bit a pseudorandom value. Herein, it is assumed that a random bit sequence with a bit length q times the first block length (q is an integer equal to or larger than two) is created.

Next, the transformation module 113 selects one of the plurality of input blocks resulting from the segmentation (step S117). Then, the transformation module 113 encrypts the selected input block with the block cipher symmetric key encryption scheme using a key based on the random bit sequence created in step S115 to derive an encrypted block (step S119). The block derived here is referred to as an intermediate block. The key used in step S119 has a key length larger than the first block length. The transformation module 113 repeatedly performs the processing of step S117 and step S119 described above until there remains no input block to be processed (step S121).

Next, the transformation module 113 selects a predetermined number of blocks out of the derived intermediate blocks (step S123). Then, the transformation module 113 concatenates the selected intermediate blocks to form an output block with a second block length (step S125). Herein, q consecutive intermediate blocks are selected and concatenated together. As a result, the second block length is equal to the bit length of the random bit sequence. The transformation module 113 repeatedly performs the processing of step S123 and step S125 described above until there remains no intermediate block (step S127).

Next, the transformation module 113 XORs between all the formed output blocks and the random bit sequence to derive a further output block (step S129).

Next, the transformation module 113 concatenates one or more output blocks formed iteratively in step S125 and the further output block derived in step S129 to form an encrypted bit sequence (step S131). Then, the transformation module 113 returns the formed encrypted bit sequence to the data input/output module 111.

The data input/output module 111 splits the encrypted bit sequence into two or more split bit sequences each containing at least one of the output blocks (step S133). Then, the data input/output module 111 stores the two or more split bit sequences in respective different storage devices. Upon completion of AONT transform, the transformation module 113 erases the random bit sequence (step S135).

[4-2. Inverse AONT Transform]

FIG. 11 is a flowchart showing an exemplary flow of a method for inverse AONT transform that may be executed by the data processing apparatus 100 according to an embodiment.

First, the data input/output module 111 concatenates two or more split bit sequences associated with target data to be recovered to form an encrypted bit sequence (step S161). Then, the data input/output module 111 outputs the formed encrypted bit sequence to the inverse transformation module 115.

Next, the inverse transformation module 115 segments the encrypted bit sequence into a plurality of input blocks each having the second block length (step S163). It is assumed that the second block length is equal to q times (q is an integer equal to or larger than two) the first block length corresponding to the block length specific to the block cipher symmetric key encryption scheme.

Next, the inverse transformation module 115 XORs between the plurality of input blocks resulting from the segmentation to recover a random bit sequence (step S165). The random bit sequence recovered here may be the same as a key used when decrypting individual blocks with the symmetric key encryption scheme. Alternatively, the random bit sequence may be a larger bit sequence including, as a part thereof, the key used when decrypting individual blocks.

Next, the inverse transformation module 115 selects one of the plurality of input blocks described above (step S167). Then, the inverse transformation module 115 separates the selected input block into a predetermined number of intermediate blocks (step S169). Herein, it is assumed that each input block is separated into q consecutive intermediate blocks. As a result, the intermediate block has a block length equal to the first block length. Further, the inverse transformation module 115 decrypts each of the intermediate blocks formed by separating the input blocks with the symmetric key encryption scheme using the key based on the recovered random bit sequence to derive the predetermined number of output blocks (step S171). The inverse transformation module 115 repeatedly performs the processing of step S167 to step S171 described above until there remains no input block to be processed (step S173). Note that the last one of the input blocks is used only for recovering the random bit sequence in step S165, and may be skipped in the iterative decryption here.

Next, the inverse transformation module 115 concatenates the plurality of output blocks derived through decryption of the intermediate blocks described above to recover an original bit sequence (step S175). Then, the inverse transformation module 115 returns the recovered original bit sequence to the data input/output module 111. Upon completion of inverse AONT transform, the inverse transformation module 115 erases the random bit sequence (step S177).

The processing steps described in this section are not necessarily executed in the illustrated order. Some of the processing steps may be executed in parallel. Further, an additional processing step may be employed, or some of the processing steps may be omitted.

5. CONCLUSION

The modified CTRT scheme described in the present disclosure removes the restriction of $k \leq l$ on the block length l and the key length k inherent in the existing CTRT scheme, and makes it possible to utilize a combination of a block cipher cryptosystem and a key length that provide more robust security for implementation of AONT transform/inverse AONT transform. Similarly to the existing CTRT scheme, the modified CTRT scheme does not include a process of which calculation cost is large, such as expansion of a hash value required by the OAEP scheme, for example. An increase in data size of the encrypted bit sequence with respect to the original bit sequence is only as large as one output block in addition to padding bits. Therefore, according to the modified CTRT scheme, it is possible to achieve robust security by selecting a longer key length while maintaining the advantages of the AONT scheme that the AONT scheme is easily utilized in a variety of systems or apparatuses having limitations in resources from various viewpoints such as processing ability, communication performance, or storage capacity.

In a practical example, the above-described cryptosystem is Advanced Encryption Standard (AES) with its specific block length of 128 bits, and an encryption key having the key length of 256 bits is selected. In this case, the key length k is just twice the block length l. Accordingly, during AONT transform, by concatenating every two intermediate blocks after AES encryption to form an output block, it is possible to easily disperse the encryption key over the whole message through XORing between the output blocks and the encryption key so as to keep it secret. Furthermore, blockwise iterations of concatenation/separation of a bit sequence and exclusive OR operation are suitable for fast sequential processing by a general-purpose processor or for further speeding up by parallelization. However, the technology according to the present disclosure is not limited to such examples and is applicable to any other combination of a key length and a block length.

The techniques described in the present specification may be realized in software, firmware, or hardware, or in any combination thereof. Computer programs constituting the software or the firmware are stored in advance in a computer-readable storage medium (non-transitory medium) arranged inside or outside the apparatus, for example. Then, the computer programs are loaded to the RAM for execution and executed by a processing circuit, for example.

The preferred embodiments of the present disclosure have been described in detail above with reference to the appended drawings, however, the technical scope of the present disclosure is not limited to the above examples. It is apparent that a person having ordinary skill in the art of the present disclosure may conceive various alterations or modifications within the scope of technical spirit described in the claims, and it will be appreciated that they will naturally come under the technical scope of the present disclosure.

For example, in the above-described embodiments, a configuration has been described as an example where, when an original bit sequence is AONT-transformed by the modified CTRT scheme, a further output block y[m] is derived by XORing between one or more output blocks y[1], . . . , y[m−1] and a random bit sequence K. However, the further output block y[m] may be derived by computing an arithmetic sum of the one or more output blocks y[1], . . . , y[m−1] and the random bit sequence K.

Furthermore, in the above-described embodiments, a configuration has been described as an example where, when an encrypted bit sequence is inversely AONT-transformed by the modified CTRT scheme, a random bit sequence K is recovered by XORing between a plurality of input blocks y[1], . . . , y[m]. However, the random bit sequence K may be recovered by computing an arithmetic difference between the plurality of input blocks y[1], . . . , y[m].

Conversely, an arithmetic difference may be used when an original bit sequence is AONT-transformed, and an arithmetic sum may be used when an encrypted bit sequence is inversely AONT-transformed.

Thus, an exclusive OR operation is not a limitation and any invertible transformation function such as an arithmetic operation is applicable to deriving y[m] using a random bit sequence K (for keeping the random bit sequence K secret) when an original bit sequence is AONT-transformed by the modified CTRT scheme, and to recovering the random bit sequence K when an encrypted bit sequence is inversely AONT-transformed by the modified CTRT scheme.

The invention claimed is:

1. A data processing apparatus for transforming an original bit sequence into an encrypted bit sequence comprising a processing circuit configured to:
segment the original bit sequence into a plurality of input blocks, each input block having a first block length;
create a random bit sequence with a bit length larger than the first block length;
encrypt respective ones of the plurality of input blocks with a block cipher symmetric key encryption scheme using a key based on the created random bit sequence to derive a plurality of intermediate blocks,
the key having a key length larger than the first block length;
concatenate every predetermined number of intermediate blocks of the derived intermediate blocks to form one or more output blocks, each output block having a second block length that is equal to the bit length of the random bit sequence;
compute an invertible transformation function on the one or more output blocks and the random bit sequence to derive a further output block having the second block length; and
output the encrypted bit sequence including the one or more output blocks and the further output block.

2. The data processing apparatus according to claim 1, wherein the invertible transformation function is exclusive OR.

3. The data processing apparatus according to claim 1, wherein the key used when encrypting respective ones of the plurality of input blocks is equal to the random bit sequence.

4. The data processing apparatus according to claim 3, wherein the symmetric key encryption scheme is Advanced Encryption Standard (AES), the first block length is 128 bits, and the second block length and the key length are 256 bits.

5. The data processing apparatus according to claim 1, wherein the processing circuit is further configured to split the encrypted bit sequence into two or more split bit sequences each containing at least one of the output blocks.

6. The data processing apparatus according to claim 5, wherein the processing circuit is further configured to store the two or more split bit sequences in respective different storage devices.

7. The data processing apparatus according to claim 1, wherein the key used when encrypting respective ones of the plurality of input blocks has the key length smaller than the bit length of the random bit sequence and is a part of the random bit sequence.

8. A method of transforming an original bit sequence into an encrypted bit sequence in a data processing apparatus, the method comprising:
segmenting the original bit sequence into a plurality of input blocks, each input block having a first block length;
creating a random bit sequence with a bit length larger than the first block length;
encrypting respective ones of the plurality of input blocks with a block cipher symmetric key encryption scheme using a key based on the created random bit sequence to derive a plurality of intermediate blocks, the key having a key length larger than the first block length;
concatenating every predetermined number of intermediate blocks of the derived intermediate blocks to form one or more output blocks, each output block having a second block length that is equal to the bit length of the random bit sequence;
computing an invertible transformation function on the one or more output blocks and the random bit sequence to derive a further output block having the second block length; and
outputting the encrypted bit sequence including the one or more output blocks and the further output block.

9. A non-transitory computer-readable medium containing thereon a computer program for transforming an original bit sequence into an encrypted bit sequence which, when executed by a processor of a data processing apparatus, causes the data processing apparatus to:
segment the original bit sequence into a plurality of input blocks, each input block having a first block length;
create a random bit sequence with a bit length larger than the first block length;
encrypt respective ones of the plurality of input blocks with a block cipher symmetric key encryption scheme using a key based on the created random bit sequence to derive a plurality of intermediate blocks, the key having a key length larger than the first block length;
concatenate every predetermined number of intermediate blocks of the derived intermediate blocks to form one or more output blocks,
each output block having a second block length that is equal to the bit length of the random bit sequence;
computing an invertible transformation function on the one or more output blocks and the random bit sequence to derive a further output block having the second block length; and
output the encrypted bit sequence including the one or more output blocks and the further output block.

10. A data processing apparatus for inversely transforming an encrypted bit sequence into an original bit sequence comprising a processing circuit configured to:
segment the encrypted bit sequence into a plurality of input blocks, each input block having a second block length larger than a first block length, wherein the first block length is equal to a block length of a block cipher of a symmetric key encryption scheme;
recover a random bit sequence utilized when transforming the original bit sequence into the encrypted bit sequence by computing an inverse transformation function of a transformation function on the plurality of input blocks, the transformation function utilized when transforming the original bit sequence into the encrypted bit sequence;
separate one or more of the plurality of input blocks respectively into a predetermined number of intermediate blocks to form a plurality of intermediate blocks each having the first block length;
decrypt respective ones of the plurality of intermediate blocks with the symmetric key encryption scheme using a key based on the recovered random bit sequence to derive a plurality of output blocks; and
concatenate the derived output blocks to recover the original bit sequence.

11. The data processing apparatus according to claim 10, wherein the transformation function is exclusive OR.

12. The data processing apparatus according to claim 10, wherein the key used when decrypting respective ones of the plurality of intermediate blocks has a key length smaller than the bit length of the random bit sequence and is a part of the random bit sequence.

13. A method of inversely transforming an encrypted bit sequence into an original bit sequence in a data processing apparatus, the method comprising:
segmenting the encrypted bit sequence into a plurality of input blocks,
each input block having a second block length larger than a first block length, wherein the first block length is equal to a block length of a block cipher symmetric key encryption scheme;
recovering a random bit sequence utilized when transforming the original bit sequence into the encrypted bit sequence by computing an inverse transformation function of a transformation function on the plurality of input blocks, the transformation function utilized when transforming the original bit sequence into the encrypted bit sequence;
separating one or more of the plurality of input blocks respectively into a predetermined number of intermediate blocks to form a plurality of intermediate blocks each having the first block length;
decrypting respective ones of the plurality of intermediate blocks with the symmetric key encryption scheme using a key based on the recovered random bit sequence to derive a plurality of output blocks; and
concatenating the derived output blocks to recover the original bit sequence.

14. A non-transitory computer-readable medium containing thereon a computer program for inversely transforming an encrypted bit sequence into an original bit sequence which, when executed by a processor of a data processing apparatus, causes the data processing apparatus to:
segment the encrypted bit sequence into a plurality of input blocks, each input block having a second block length larger than a first block length, wherein the first block length is equal to a block length of a block cipher symmetric key encryption scheme;
recover a random bit sequence utilized when transforming the original bit sequence into the encrypted bit sequence by computing an inverse transformation function of a transformation function on the plurality of input blocks, the transformation function utilized when transforming the original bit sequence into the encrypted bit sequence;
separate one or more of the plurality of input blocks respectively into a predetermined number of intermediate blocks to form a plurality of intermediate blocks each having the first block length;
decrypt respective ones of the plurality of intermediate blocks with the symmetric key encryption scheme using a key based on the recovered random bit sequence to derive a plurality of output blocks; and
concatenating the derived output blocks to recover the original bit sequence.

* * * * *